United States Patent
Otani

[11] 3,900,078
[45] Aug. 19, 1975

[54] SAFETY HARNESS ARRANGEMENT
[75] Inventor: Syuichi Otani, Tokyo, Japan
[73] Assignee: Nissan Motor Co., Ltd., Yokohama City, Japan
[22] Filed: Mar. 21, 1973
[21] Appl. No.: 343,260

[30] Foreign Application Priority Data
Mar. 22, 1972 Japan............... 47-33716

[52] U.S. Cl. ................. 180/82 R; 280/150 SB
[51] Int. Cl. ............................................ B60r 21/10
[58] Field of Search ............... 280/150 SB; 180/82; 297/388

[56] References Cited
UNITED STATES PATENTS

| | | | |
|---|---|---|---|
| 3,371,960 | 3/1968 | Bayer et al. | 280/150 SB |
| 3,620,569 | 11/1971 | Mathis | 280/150 SB |
| 3,653,714 | 4/1972 | Gentile | 180/82 C |
| 3,680,883 | 8/1972 | Keppel et al. | 280/150 SB |
| 3,822,760 | 7/1974 | Lindblad | 280/150 SB |
| 3,830,518 | 8/1974 | Silber | 280/150 SB |

*Primary Examiner*—Leo Friaglia
*Assistant Examiner*—R. Schrecengost

[57] ABSTRACT

A safety harness arrangement is disclosed which is well compatible with a closed two-door sedan which is void of doors associated with the rear seat. The safety arrangement has a webbing which is guided along inner surfaces of a side structural member and a ceiling of the vehicle body adjacent the rear seat through selective actuation of drive means which is repsonsive to the forwardly tilted condition of seat back of a front bucket seat and to the positions of the webbing which are operative and inoperative to restrain an occupant of the rear seat.

10 Claims, 8 Drawing Figures

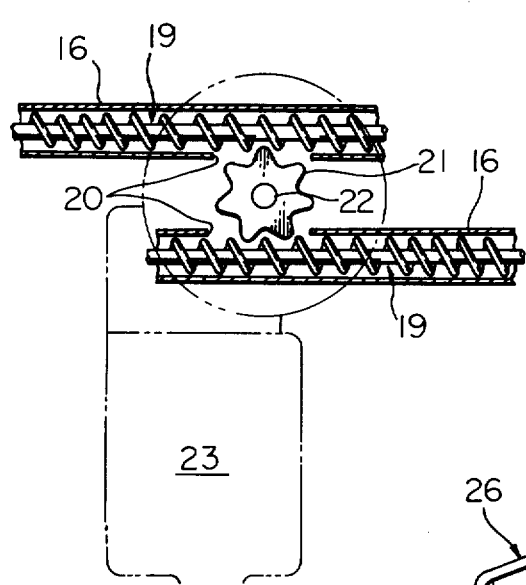
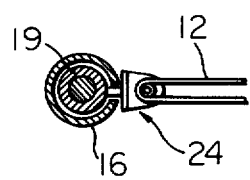
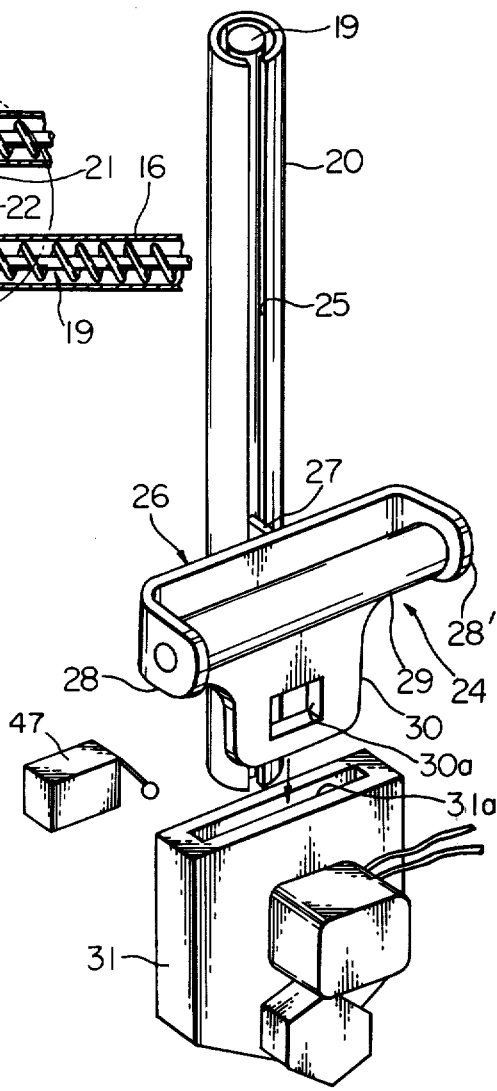
Fig. 3
Fig. 4
Fig. 5

SAFETY HARNESS ARRANGEMENT

The present invention relates to safety arrangements to be mounted on motor vehicles for protecting vehicle occupants from being injured in the event of collisions encountered by the motor vehicles. More specifically, the present invention is concerned with the safety arrangements of the character using safety harnesses such as seat belts and shoulder straps for preventing the vehicle occupants from being flung forward when the motor vehicles encounter frontal collisions.

While the safety arrangement herein disclosed will be adaptable to any type of motor vehicles, the same will prove most advantageous where mounted in association with rear seats of closed two-door sedans which typically are two-door hardtops.

Fully automatized safety harness arrangements are now used on modern sophisticated motor vehicles. The safety arrangements are usually adapted to be actuated into or out of operative or protective positions in response to closing and opening of the doors of the vehicles. Thus, the automatized safety harness arrangements presently in use can not be used on rear seats of the two-door sedans which are void of the doors to which the harness arrangements are connected.

It is, therefore, an object of the present invention to provide a safety harness arrangement which is compatible with a two-door sedan.

As will be understood as the description proceeds, the particular object of the present invention is accomplished in a safety harness arrangement which comprises a webbing anchored at one end to a lower stationary member located at a relatively low part of a vehicle cabin adjacent a seat and at the other end to an upper stationary member located at a relatively upper part of the vehicle cabin, biasing means for constantly pulling the webbing longitudinally toward the upper stationary member for urging an upper lengthwise portion of the webbing in a retracted condition on the upper stationary member, an elongated guide member which has one end located at another relatively lower part of the vehicle cabin adjacent the seat and spaced apart substantially transversely of the seat from the lower stationary member across and over the seat and which extends partly generally upwardly on an inner surface of a side structural member of the vehicle body and partly substantially horizontally over the seat, an elongated flexible member longitudinally movable along the guide member, retaining means movable with the flexible member along the guide member and retaining thereon a portion of the webbing intermediate between the upper and lower stationary members, the retaining means being movable along the guide member between a first position holding the webbing in a condition to restrain an occupant of the seat and a second position to hold the webbing in a condition inoperative to restrain the seat occupant, drive means operative to drive the flexible member for moving the retaining means between the first and second positions on the guide member, and an electrical control unit which is operative to actuate the drive means for moving the retaining means between the first and second positions and which is responsive to arrivals of the retaining means at the first and second positions for causing the drive means to stop at the first or second position depending upon the direction of the movement of the flexible member.

The nature of the safety harness arrangement according to the present invention and the advantages of the same over the prior art counterparts will become more apparent from the following description taken in conjunction with the accompanying drawings in which:

FIG. 3 is a longitudinal sectional view which shows a preferred example of the guide member forming part of the safety harness arrangement shown in FIGS. 1 and 2;

FIG. 4 is a cross sectional view of the guide member illustrated in FIG. 3 and the webbing retaining means connected to the guide member;

FIG. 5 is a perspective view showing, on an enlarged scale, the detailed construction of the retaining means illustrated in FIG. 4;

Figure 1:
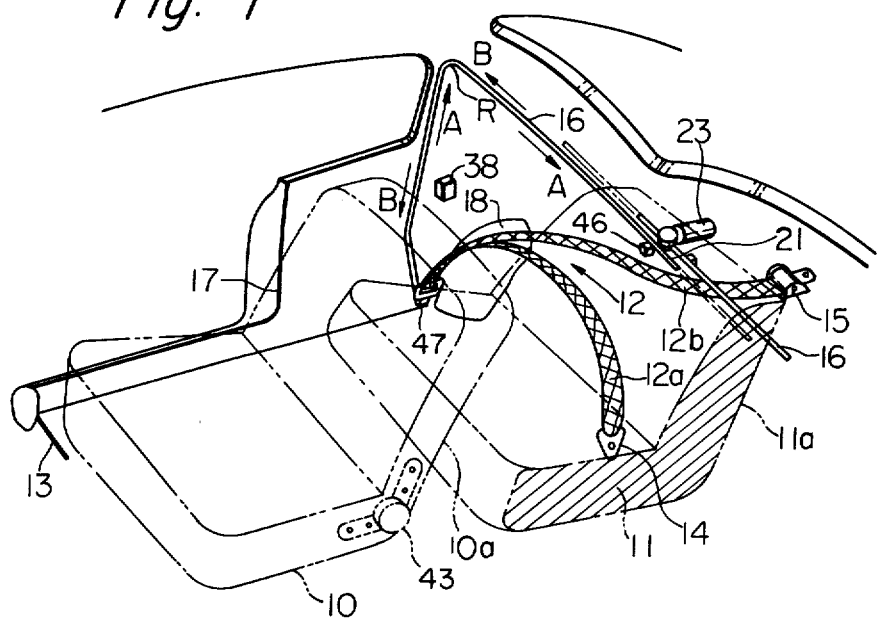
FIG. 1 is a schematic perspective view which shows a preferred embodiment of the safety harness arrangement according to the present invention, the harness arrangement being herein illustrated as being held in a position to retrain a seat occupant.

Reference will now be made to the drawings, particularly concurrently to FIGS. 1 and 2.

As previously noted, the safety harness arrangement according to the present invention is especially advantageous for use with a rear seat of a closed tow-door sedan, although the same will find practical applications in motor vehicles of various other types. The safety harness arrangement is thus illustrated in FIGS. 1 and 2 as being incorporated in a closed two-door sedan having a front bucket seat 10 and a rear stationary seat 11. The front bucket seat 10 has a seat back 10a which is tiltable from its upright position shown in FIG. 1 to a forwardly inclined position shown in FIG. 2 for providing a passenger with an unrestricted passage when the passenger is about to enter or leave the vehicle cabin.

The safety harness arrangement includes a webbing 12 which is anchored at one end to a floor pan 13 underneath the rear seat 11 through a suitable fixture 14 and connected at the other end to a winder 15 which is fast on a parcel shelf located rearwardly of the top of the seat back 11a of the rear seat 11. The winder 15 is adapted to urge the upper lengthwise portion of the webbing 12 to be retracted thereto and wound thereon by a biasing force which constantly pull the webbing toward the winder. As will become clear as the description proceeds, the webbing 12 has a position operative to restrain a seat occupant and a position inoperative to restrain the seat occupant depending upon the position of the seat back 10a of the front seat, such positions of the webbing 12 being illustrated in FIGS. 1 and 2, respectively. When the webbing 12 is thus held in the position operative to restrain the occupant, the webbing has a seat belt section 12a and a shoulder strap section 12b as seen in FIG. 1. To move the webbing 12 between these two positions, a conduit or elongated hollow guide member 16 is fast on an inner surface of the vehicle body structure defining the vehicle cabin. The guide member 16 has a portion generally vertically extending on an inner surface of a side structural member 19 of the vehicle body adjacent the side end of the seat 11 opposite to the fixture 14 and a substantially horizontal portion extending on or along an inner surface of a roof panel over the seat 10. More specifically, the guide member 16 has one end located adjacent a foremost sill area of a rear wheel housing 18 and extends a certain length upwardly and appreciably forwardly on the inner surface of the side structural member 17. The guide member 16 then extends vertically on a quarter panel toward a roof side rail adjacent the ceiling of the vehicle body and merges into the horizontal portion through a curved portion having a predetermined radius of curvature R. The guide member 16 terminates at a rear wheel housing (not shown) on the opposite side of the vehicle body along a path which is analogous to that illustrated in FIGS. 1 and 2. Where it is desired that the seat 11 be provided with two or more safety harness arrangements for the seat section or sections next to the shown seat section, two or more guide members 16 are installed on the vehicle cabin as illustrated in FIGS. 1 and 2.

As illustrated in FIGS. 3 and 4, a flexible rack 19 consisting of a flexible wire and spiral teeth formed thereon is longitudinally movably received in the hollow guide member 16. The guide member 16 is formed with an elongated opening 20 through which the flexible rack 19 is in constant mesh with a pinion 21. The pinion 21 has a shaft 22 which is connected to an output shaft (not shown) of a reversible motor 23. In FIGS. 3 and 4, the pinion 21 is shown to be in mesh with two flexible racks 19 received in two guide members 16 since it is assumed in FIGS. 1 and 2 that the rear seat is equipped with two safety harness arrangements. The flexible rack 19 is connected to the webbing 12 through a suitable retaining means which is generally designated by reference numeral 24 in FIG. 4 so that the webbing 12 is movable along the elongated hollow guide member 16 between the previously noted positions operative and inoperative to restrain the seat occupant. A preferred example of the retaining means 24 of this nature is depicted in FIGS. 5 and 6.

Figure 6:
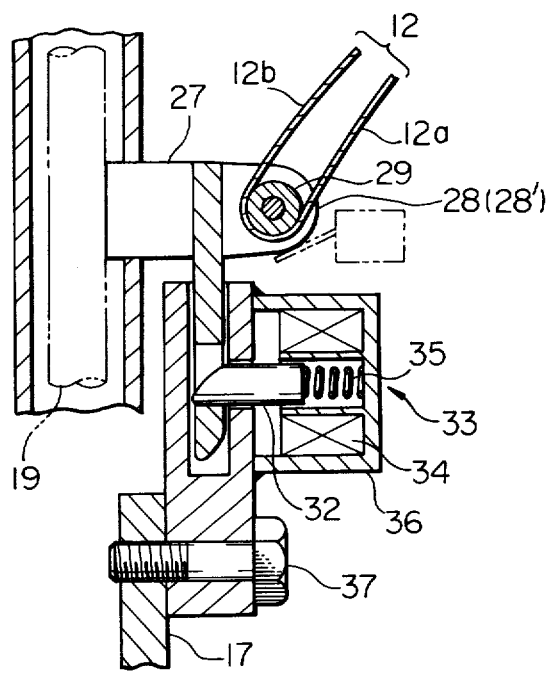
FIG. 6 is a sectional view of the retaining means shown in FIG. 5.

Referring to FIGS. 5 and 6, the elongated hollow guide member 16 is formed with a slot 25 extending substantially throughout its length. A cross member 26 is connected to the flexible rack 16 in the guide member 19 through a connecting member 27 which is movable in the groove 25 with the flexible rack 19 in a longitudinal direction of the guide member 16. The cross member 26 has a pair of spaced arms 28 and 28' supporting an elongated roller 29 which is in spaced parallel relation to the cross member 27. The webbing 10 is retained on this elongated roller 29 at its intermediate portion as will be seen more clearly in FIGS. 1 and 2.

The reversible motor 23 is located adjacent the horizontal portion of the guide member 16 substantially over the fixture 14 on the floor pan 13 so that the retaining means 24 is movable between the position close to the lower end of the guide member 16 and the position which is approximately vertically aligned with the fixture 14. The motor 23 is adapted to be driven in two opposed directions under the control of an electrical control circuit which will be described later. When the motor 23 is driven in one direction (which will be hereinafter called the first direction), the retaining means 24 and accordingly the portion of the webbing 12 retained thereon are moved along the guide member 16 in a direction of arrowheads A in FIGS. 1 and 2 viz., from the position close to the lower end of the guide member 16 to the position adjacent the motor 23. When the motor 23 is driven in the reverse direction (which will be hereinafter called the second direction) then the retaining means 24 is moved backwardly in a direction of arrowheads B.

To have the retaining means 24 locked when the position close to the lower end of the guide member 16 is reached thereby, suitable locking means may be provided in association with the retaining means. Thus, the cross member 26 of the retaining means shown in FIGS. 4 and 5 has a downward extension 30 which is formed with an opening 30a. A plug member 31 is fast one the inner surface of the side structural member 17 (FIG. 1) of the vehicle body and has a cavity 31a which is so sized as to receive the extension 30 of the cross member 26 therein when the extension 30 is moved thereinto as indicated by an arrow in FIG. 5. The extension 30 may preferably have its lower end portion tapered or reduced as seen in FIG. 6. A solenoid operated plunger 32 movable at its leading end portion into the cavity 31a so as to be received in the opening 30a in the extension 30 when the extension is fully admitted into the cavity 31a as seen in FIG. 6. The plunger 32 is operated by a solenoid device 33 having a solenoid coil 34 and a compression spring 35 urging the plunger 32 forwardly, viz., toward the cavity 31a in the plug 31. The plunger 32 thus serves also as a core of the solenoid device 33 and is forced to withdraw from the cavity 31a of the plug 31 against the action of the compression spring 35 when the solenoid coil 34 is energized. Where the extension 30 has its lower end portion reduced as above mentioned, the plunger 32 may also be reduced at its leading end portion to be in sliding engagement with the reduced end portion of the former. The combination core and plunger 32, coil 34 and spring 35 are shown to be encased within a solenoid housing 36 which is fast on the plug 31. The plug 31, in turn, is shown to be rigidly connected to the inner surface of the side structural member 17 of the vehicle body by, for example, a bolt 37. The solenoid coil 34 is energized and de-energized by means of the electrical control circuit which is arranged in a preferred form as illustrated in FIG. 7.

Figure 7:
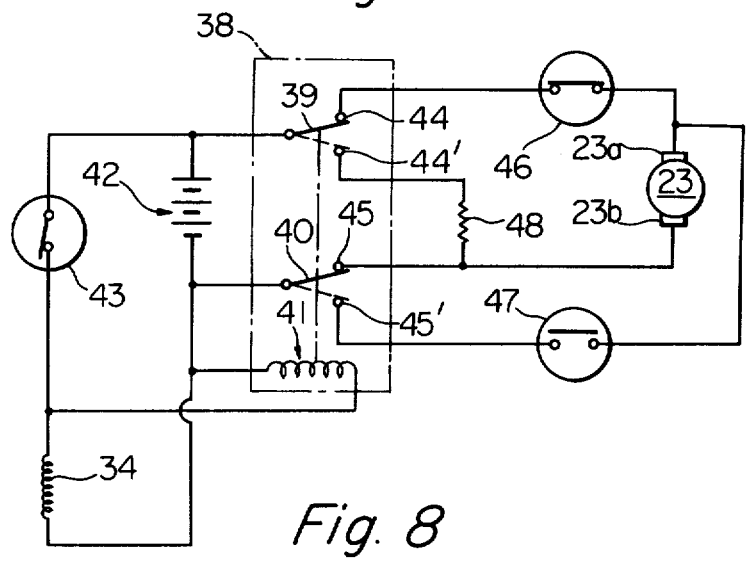
FIG. 7 is a diagram which shows a preferred example of the electrical control circuit to be incorporated in the safety harness arrangement according to the present invention.

Referring to FIG. 7 the electric control circuit comprises a relay 38 having first and second movable contacts 39 and 40 respectively, and a coil 41 to move the contacts when energized and de-energized. The first movable contact 39 is connected to the positive terminal of a power source 42 while the second movable contact 40 connected to the negative terminal of the power source 42. The coil 41 is serially connected to the power source over a first switch 43. This switch 43 is mounted on the front bucket seat 10 as illustrated in FIGS. 1 and 2 so as to be responsive to the position of the seat back 10a relative to the seat 10. Thus, the switch 43 is adapted to open when the seat back 10a is held in the upright position shown in FIG. 1 and close when the seat back 10a is tilted forward to the position shown in FIG. 2 for providing a wider passage between the front and rear seats 10 and 11, respectively.

The first movable contact 39 of the relay 38 is associated with two stationary contacts 44 and 44' and, likewise, the second stationary contact 40 is associated with two stationary contacts 45 and 45'. The movable contacts 39 and 40 are biased to be connected to the stationary contacts 44 and 44' and are forced to be connected to the stationary contacts 44 and 45 when the coil 41 is energized. The stationary contacts 44 and 45' are connected to one input terminal 23a of the reversible motor 23 across limit switches 46 and 47, respectively. The stationary contacts 44' and 45 are connected to the other input terminal 23b of the reversible motor 23. As will be understood from the reason to be explained later, it is preferable that the stationary contact 44' be connected to the input terminal 23a of the motor 23 through a resistor 48.

Where the locking means of the construction shown in FIGS. 5 and 6 is incorporated in the safety harness arrangement using the control circuit of the above described construction, the solenoid coil 34 may be serially connected between the d.c. power source 42 and the switch 43.

Figure 2:
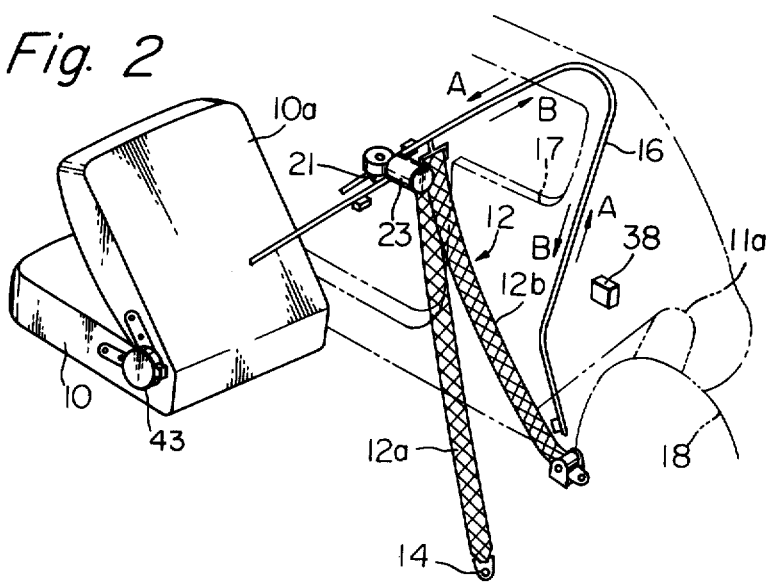
FIG. 2 is perspective view showing the safety harness arrangement of FIG. 1 in a position inoperative to restrain the seat occupant.

The limit switch 46 is located in the vicinity of the reversible motor 23, viz., substantially vertically aligned with the fixture 14 securing the end of the webbing 12 to the floor pan 13 as seen in FIGS. 1 and 2. The limit switch 46 is thus adapted to be normally closed and to open in response to an arrival of the retaining means 24 in the vicinity of the motor 23. On the other hand, the limit switch 47 is located in the vicinity of the lower end of the guide member 16 and is adapted to be normally closed and to open in response to the arrival of the retaining means 24 in the vicinity of the lower end of the guide member 16.

When, now the seat back 10a of the front bucket seat 10 is tilted forward by a passenger entering or leaving the vehicle cabin, then the switch 43 mounted on the seat 10 closes so that a closed circuit is made up between the d.c. power source 42 and the coil 41 of the relay 38. The coil 41 is energized from the power source 42 for moving the movable contacts 39 and 40 to the stationary contacts 44 and 45 as indicated by full lines in FIG. 7. Since, in this condition, the retaining means 24 is assumed to be located at the position close to the lower end of the guide member 16, the normally-closed limit switch 46 remains closed so that the reversible motor 23 is energized from the power source 42 with its terminals 23a and 23b connected respectively to the positive and negative terminals of the d.c. power source 42. The reversible motor 23 is consequently driven in the first direction for moving the flexible rack 19 and accordingly the retaining means 24 along the elongated hollow guide member 16 in the direction of arrows A in FIGS. 1 and 2 viz., from the lower end of the guide member 16 toward the position substantially above the fixture 14 on the floor pan 13. In other words the retaining means 24 seizing the webbing 12 at its intermediate portion is first moved upwardly and appreciably forwardly from the lower end of the guide member 16, then upwardly on the quarter panel of the side structure of the vehicle body, and substantially horizontally along the roof trim on the ceiling until it reaches the position in proximity to the motor 23. When the retaining means 24 thus arrives at the position close to the motor 23, then the limit switch 46 opens so that the input terminal 23a of the reversible motor 23 is disconnected from the power source 42 for bringing the retaining means 24 to a full stop at the position above the fixture 14, as seen in FIG. 2. As the retaining means 24 travels on the guide member 16, the webbing 12 has its intermediate portion moved along the guide member 12 and is accordingly separated from the seat occupant or at least only loosely in contact with the seat occupant, allowing the occupant out of restraint of the webbing when the webbing assumes the position shown in FIG. 2. Under this condition, the webbing 12 is constantly pulled toward the winder 15 so that the upper lengthwise portion of the webbing is retracted to and wound on the winder. The webbing 12 in the retracted condition is thus maintained taut by means of the biasing force imparted thereto from the winder 15. The seat occupant will therefore be permitted to leave the seat without being interferred with by webbing in the rest condition.

When, then, the seat back 10a of the front bucket seat 10 is moved back to its upright position shown in FIG. 1 by the passenger who has left the vehicle cabin or who is about to occupy the rear seat 11 for a second time, then the switch 43 on the front bucket seat 11 opens so that the coil 41 of the relay 38 is de-energized. The movable contacts 39 and 40 are consequently allowed to move back to the stationary contacts 44' and 45' as indicated by broken lines in FIG. 7. Since, under this condition, the limit switch 47 located adjacent the lower end of the guide member 16 is left closed with the retaining means 24 located in the neighbourhood of the motor 23, the stationary contact 45' is connected to the terminal 23a of the reversible motor 23 through the limit switch 47, while the other stationary contact 45 is connected to the terminal 23b of the motor 23 through the resistor 48. The reversible motor 23 thus has its terminals 23a and 23b connected to the negative and positive terminals, respectively, of the d.c. power source 42 and is consequently driven to rotate in the second direction previously defined. The reversible motor 23 now drives the flexible rack 19 away from the position close to the motor so that the retaining means 24 and accordingly the intermediate portion of the webbing 12 are moved along the guide member 16 in the direction of arrows B in FIGS. 1 and 2 until they reach the positions close to the lower end of the guide member 16. As the retaining means 24 and the intermediate portion of the webbing 12 are moved in the direction of arrows B in this manner, the upper lengthwise portion of the webbing 12 is unwound from the winder 15 against the biasing force constantly applied to the webbing 12 from the winder 15. The webbing 12 is thus moved to its position operative to restrain the occupant of the rear seat 11 with the seat belt section 12a and shoulder strap section 12b positioned over the seat 11 as seen in FIG. 1. In this instance, it may be noted that the reversible motor 23 is driven in the second direction at a reduced speed due to the existance of the resistor 48 between the terminal 23a of the motor 23 and the positive terminal of the power source 42 so that the retaining means 24 is moved in the direction of arrows B at a rate which is lower than the rate at which the retaining means 24 is moved in the direction of arrows A. Thus, the webbing 12 is moved to its protective position more slowly and softly than when the same is moved toward its rest position shown in FIG. 2.

When the retaining means 24 reaches the position close to the lower end of the guide member 16, then the limit switch 47 will open so that the input terminal 23a of the reversible motor 23 is disconnected from the power source 42. The motor 23 is consequently stopped and accordingly the retaining means 24 is held in proximity to the lower end of the guide member 16, holding the webbing 12 in the protective position shown in FIG. 1.

The protective position of the webbing is maintained by the locking means previously described with reference to FIGS. 5 and 6. When the retaining means 24 is moving toward the lower end of the guide member 16, the coil 34 of the solenoid device 33 remains de-energized with the switch 43 on the front bucket seat 10 kept open so that the plunger 32 is urged into the cavity 31a of the plug 31 by the action of the compression spring 35. As the lower extension 30 of the cross member 26 making up the retaining means 24 is moved into the cavity 31a of the plug 31, the extension 30 is brought into sliding engagement at its reduced lower end portion with the reduced leading portion of the plunger 32 until its receives the plunger 32 in its opening 30a as seen in FIG. 6. Under this condition the lower extension 30 of the cross member 26 prevented from being upwardly moved from the plug 31 through locking engagement between the plug 31 and plunger 32. When, however, the switch 43 on the front bucket seat 10 is closed in response to the tilting movement of the seat back 10a of the bucket seat 10, the coil 34 is energized from the power source 42 through the switch 43 so that the plunger 32 is forced to withdraw from the cavity 31a of the plug 31 against the action of the compression spring 35, allowing the extension 30 and accordingly the retaining means 24 to move upwardly from the plug 31, viz., from the position close to the lower end of the guide member 16.

Figure 8:
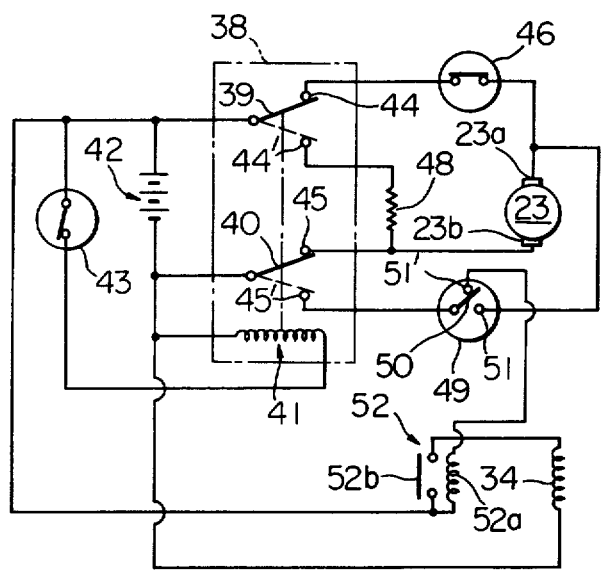
FIG. 8 is a diagram similar to FIG. 7 but now shows another preferred example of the electrical control unit for use in the safety harness arrangement embodying the present invention.

FIG. 8 illustrates another preferred example of the control circuit to form part of the safety harness arrangement according to the present invention. The control circuit herein shown is similar in essence to the circuit above described, differing from the circuit of FIG. 7 in the construction of the section to control the locking means. Referring to FIG. 8, the stationary contact 45' is connected to the input terminal 23a of the reversible motor 23 across a limit switch 49. This switch has a movable contact 50 and two stationary contacts 51 and 51'. One stationary contact 51 is for connection to the input terminal 23a of the reversible motor 23. A relay 52 has a coil 52a which is serially connected between the other stationary contact 51' and the positive terminal of the power source 42. The coil 52a is associated with normally open contacts 52a which are serially connected between the negative terminal of the power source 42 and the coil 34 of the solenoid device 33 of the locking means illustrated in FIG. 6.

Similarly to the limit switch 47 of the control circuit illustrated in FIG. 7, the switch 49 is located in proximity to the lower end of the guide member 16 (FIGS. 1 and 2) and is so arranged as to have its movable contact 50 biased to be connected to the stationary contact 51 and moved to the other stationary contact 51' in response to the arrival of the retaining means 24 at the position close to the lower end of the guide member 16.

When, thus, the movable contact 50 is connected to the latter stationary contact 51', the coil 52a of the relay 52 is energized from the power source 42 through the movable contact 40 connected to the stationary contact 45', the contacts 52b close so as to energize the coil 34 of the solenoid device 33. The plunger 32 is consequently forced to withdraw from the cavity 31a of the plug 31 against the action of the compression spring 35, allowing the retaining means 24 to move upwardly from the lower end of the guide member 16. The coil 34 of the solenoid device 33 will be de-energized when the retaining means 24 is moved back to the position adjacent the lower end of the guide member 16 and accordingly the movable contact 50 of the limit switch 49 is moved from the stationary contact 51' to the stationary contact 51, allowing the plunger 32 into the locking position in the cavity 31a in the plug 31.

In designing the safety harness arrangement thus far described, consideration may be paid to the fact that an appreciable amount of delay should be provided between the withdrawal of the plunger 32 from the cavity in the plug 31 and the start-up of the reversible motor 23 after the switch 43 on the front bucket seat 10 has been closed in response to the tilting movement of the seat back of the bucket seat. For this purpose, a suitable amount of mechanical allowance may be provided between the flexible rack 19 and the retaining means 24 or, as an alternative, suitable delay means may be incorporated in the control circuit shown in FIG. 7 or 8.

What is claimed is:
1. A safety harness arrangement for use in a motor vehicle, comprising,
- a webbing anchored at one end to a lower stationary member located at a relatively low part of a vehicle cabin adjacent a seat and at the other to an upper stationary member located at a relatively upper part of the vehicle cabin,
- an elongated hollow guide member having a longitudinally extending slot formed in the peripheral wall thereof, said guide member having one end located at another relatively low part of the vehicle cabin adjacent said seat and spaced apart substantially transversely of the seat from said lower stationary member across and over said seat and which extends partly generally vertically on an inner surface of a side structual member of a vehicle body and partly substantially horizontally over said seat,
- an elongated flexible member accommodated in said guide member and being longitudinally movable along said guide member,
- retaining means so connected to said flexible member as to be movable through said slot and retaining thereon an intermediate portion of said webbing, said retaining means being movable along said guide member between a first position holding the webbing in a condition to restrain an occupant of said seat and a second position to hold the webbing in a condition inoperative to restrain the seat occupant,
- drive means operative to drive said flexible member moving said retaining means between said first and second positions on said guide member,
- a first switch which is manually controlled for energizing and de-energizing said drive means,
- a second switch responsive to the arrival of said retaining means at said first position for energizing said drive means to be driven in a first direction to move said retaining means from said first to second position when said first switch is closed and simul- taneously said retaining means is off said first position, and a third switch responsive to the arrival of said retaining means at said second position for energizing said drive means to be driven in a second direction to move said retaining means from said second to first position when said first switch is open and simultaneously said retaining means is off said second position.

2. A safety harness arrangement as claimed in claim 1, further comprising biasing means for constantly pulling said webbing longitudinally toward said upper stationary member for urging an upper lengthwise portion of the webbing in a retracted condition on the upper stationary member.

3. A safety harness arrangement as claimed in claim 1 further comprising locking means responsive to the arrival of said retaining means at said first position for locking the retaining means in said first position until said drive means is actuated to move said retaining means from the first position.

4. A safety harness arrangement as claimed in claim 1, said flexible member comprises a wire longitudinally movably received on said guide member and spiral teeth formed on said wire and driven through gearing from said drive means.

5. A safety harness arrangement as claimed in claim 1, in which said retaining means comprises a cross member movable with said flexible member along said guide member and a roller carried on said cross member for retaining said webbing at its intermediate portion.

6. A safety harness arrangement as claimed in claim 5, further comprising an extension formed on said cross member and having an opening formed therein and a solenoid-operated plunger movable into and out of said opening for locking said extension when moved into the opening, said solenoid-operated plunger being biased into said opening and forced to withdraw from the opening in response to actuation of said drive means.

7. A sefety harness arrangement as claimed in claim 1, in which said drive means comprises a reversible motor having an output shaft drivingly engaging said flexible member, said reversible motor being controlled by an electric control unit including therein said first, second and third switches.

8. A safety harness arrangement as claimed in claim 1, in which said first switch is responsive to a forward tilting movement of the seat back of the front bucket seat for being closed when the seat back of the bucket seat is tilted forwardly.

9. A safety harness arrangement for use in a closed two-door sedan equipped with a front bucket seat having a forwardly tiltable seat back and a rear seat, comprising a webbing anchored at one end to a lower stationary member located at a relatively low part of a vehicle cabin adjacent said reat seat and at the other end to an upper stationary member located at a relatively upper part of the vehicle cabin, an elongated guide member which one end located at another relatively low part of the vehicle cabin adjacent said rear seat and spaced apart substantially transversely of the rear seat from said lower stationary member across and over said rear seat and which extends partly generally vertically on an inner surface of a side structural member of a vehicle body and partly substantially horizontally over said rear seat, an elongated flexible member longitudinally movable along said guide member, retaining means movable with said flexible member along said guide member and retaining thereon an intermediate portion of said webbing, said retaining means being movable along said guide member between a first position to hold said webbing in a condition to restrain an occupant of said rear seat and a second position to hold the webbing in a condition inoperative to restrain the seat occupant, reversible drive means operative to drive said flexible member for moving said retaining means in either direction between said first and second positions on said guide member, a first switch manually controlled for energizing and de-energizing said drive means a second switch responsive to an arrival of said retaining means at said first position for energizing said drive means to be driven in a first direction to move said retaining means from said first to second position when said first switch is closed and simultaneously said retaining means is off said first position and a third switch responsive to an arrival of said retaining means at said second position for energizing said drive means to be driven in a second direction to move said retaining means from said second to first position when said first switch is open and simultaneously said retaining means is off said second position.

10. A safety harness arrangement as claimed in claim 9, in which said first switch is responsive to a forward tilting movement of the seat back of said front bucket seat for being closed when the seat back of the seat is is tilted forwardly.

* * * * *